Feb. 21, 1928.
H. W. TINKER
BUMPER DEVICE FOR VEHICLES
Filed June 26, 1926
1,659,842
3 Sheets-Sheet 1
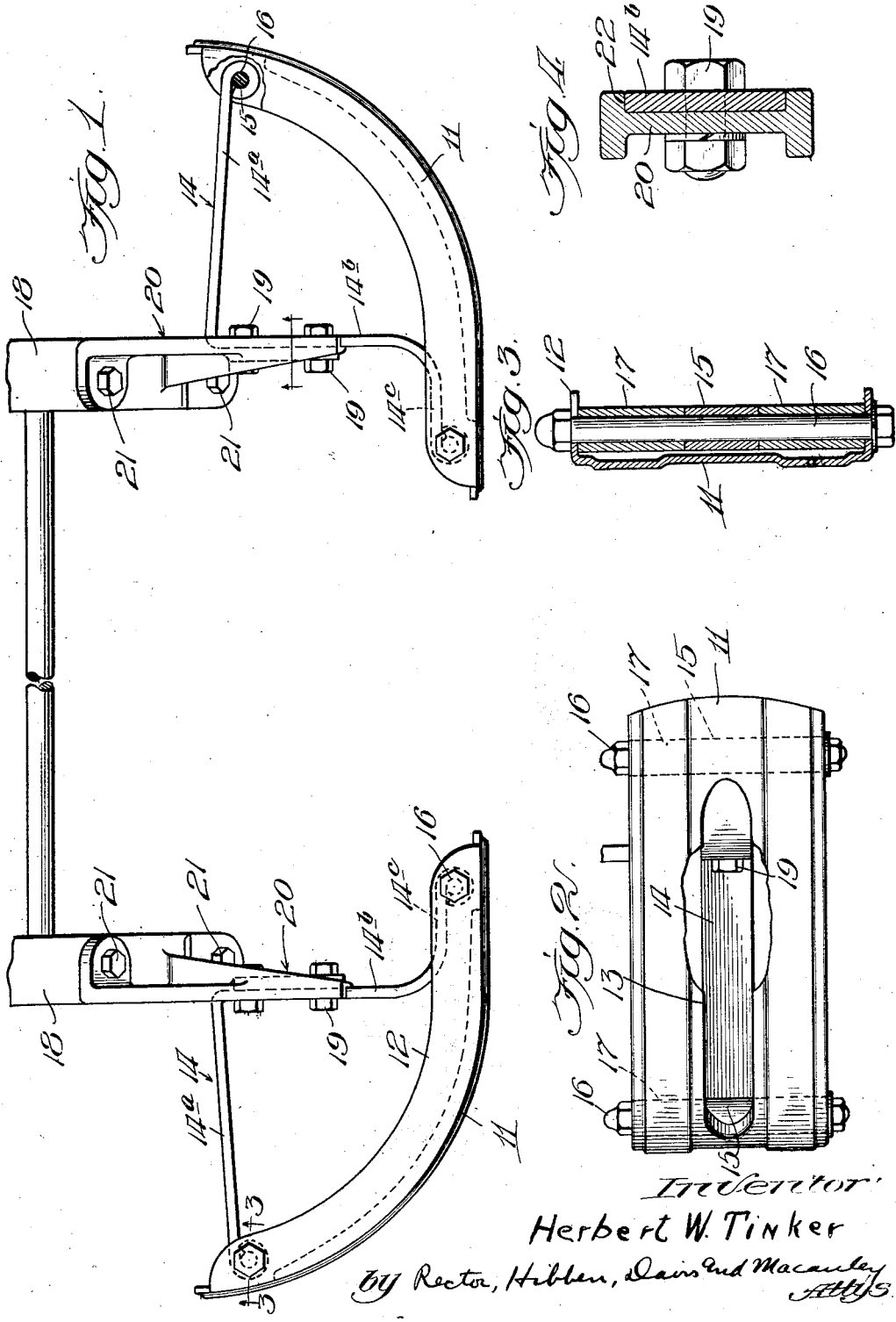
Inventor
Herbert W. Tinker
By Rector, Hibben, Davis and Macauley
Attys

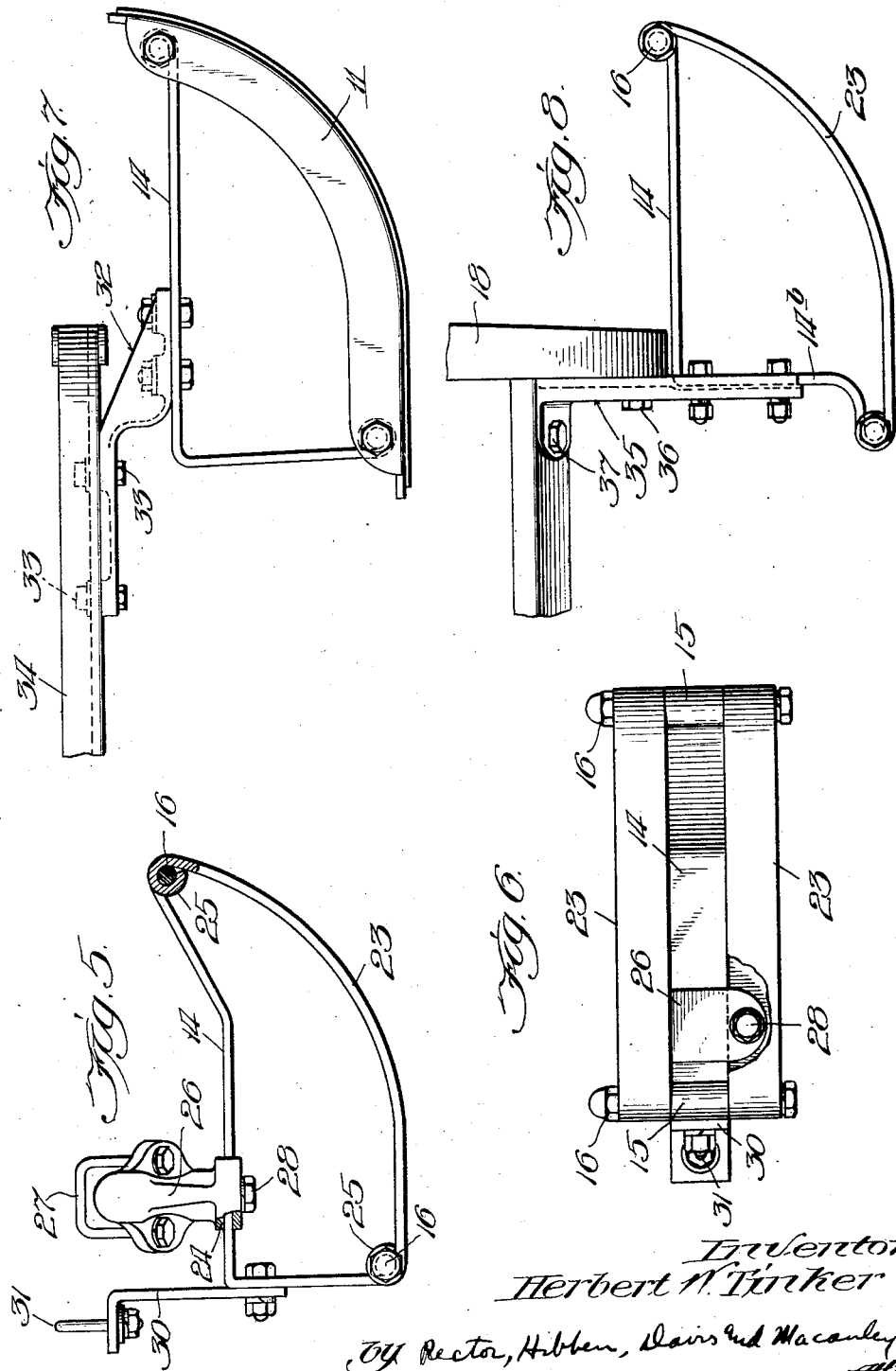

Feb. 21, 1928.　　　　　　　　　　　　　　　1,659,842
H. W. TINKER
BUMPER DEVICE FOR VEHICLES
Filed June 26, 1926　　　　　3 Sheets-Sheet 3
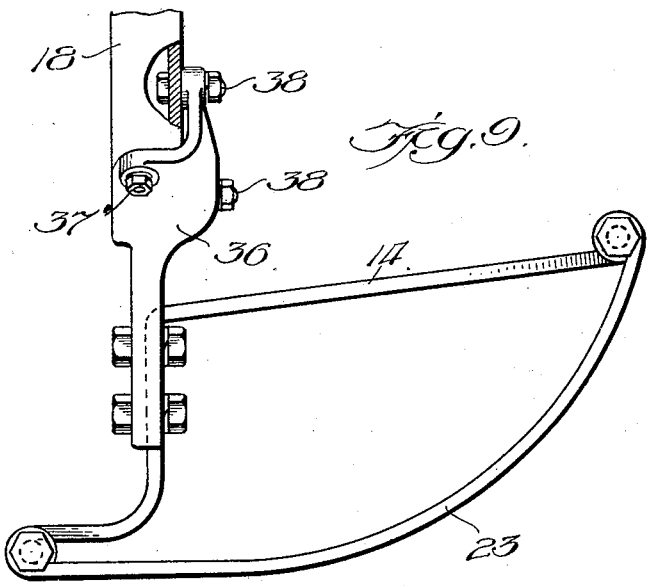
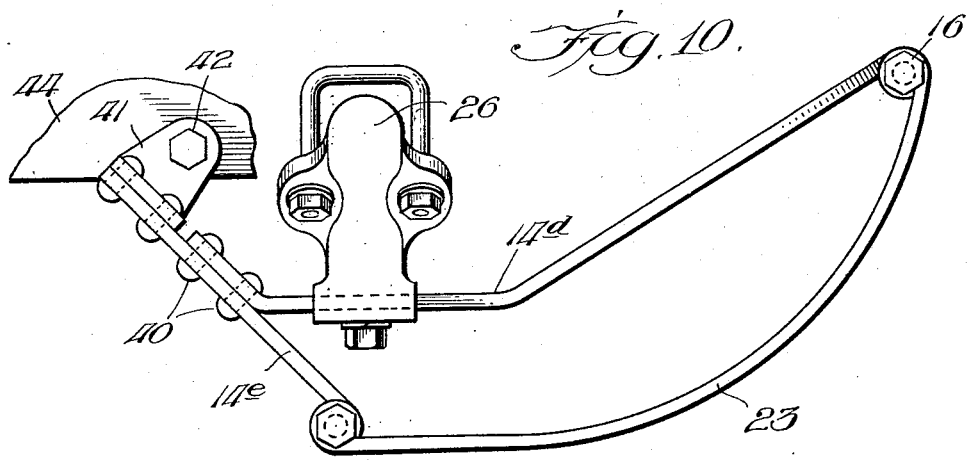
Inventor:
Herbert W. Tinker
By Rector, Hibben, Davis and Macauley
Attys Patented Feb. 21, 1928.

1,659,842

UNITED STATES PATENT OFFICE.

HERBERT W. TINKER, OF MILWAUKEE, WISCONSIN, ASSIGNOR TO FEDERAL PRESSED STEEL COMPANY, OF MILWAUKEE, WISCONSIN, A CORPORATION OF WISCONSIN.

BUMPER DEVICE FOR VEHICLES.

Application filed June 26, 1926. Serial No. 118,798.

My invention relates to bumper devices for vehicles, and more particularly to that class generally known as fender guards, in which the impact members at the rear of the vehicle are spaced apart to accommodate a spare tire therebetween.

This application is a continuation in part of my application Serial No. 102,805, filed April 17, 1926, for bumper devices for vehicles.

The principal object of my invention is to provide improved means for supporting the impact member or members of each fender guard and also improved means for mounting the fender guards on the vehicle frame.

The above and further objects and advantages of my improved fender guard structures will become apparent from the following description, taken in conjunction with the accompanying drawings.

In said drawings, Fig. 1 is a top plan view showing fender guards mounted on the rear end of a chassis frame; Fig. 2 is a rear elevation of the left-hand fender guard shown in Fig. 1; Fig. 3 is a cross-sectional view taken through one end of one of the fender guards as on the line 3—3 of Fig. 1; Fig. 4 is a cross-sectional view taken through one of the securing brackets shown in Fig. 1, the section being taken as on the line 4—4 of Fig. 1; Fig. 5 is a top plan view of a fender guard of modified construction; Fig. 6 is a rear elevation of the fender guard shown in Fig. 5; and Figs. 7, 8, 9 and 10 are top plan views of fender guards embodying still further modifications.

The impact bars or members, shown in Figs. 1, 2 and 3, are of arcuate form and each preferably consists of a sheet-metal bar 11, pressed in a die to form rearwardly extending flanges 12 at the upper and lower edges of its web or face which is provided with an elongated flanged opening 13 (Fig. 2).

As shown in Fig. 1, each impact bar is supported by a one-piece spring-supporting bar or strap 14 having eyes 15 (Figs. 1, 2 and 3), integrally formed at its ends for the reception of bolts 16 which project through holes in the flanges 12 and through the integral eyes 15 and suitable spacing collars 17, positioned between the eyes 15 and the flanges 12. It will be observed that the spring bar 14 is bent to provide a laterally or outwardly extending portion 14$^a$, a rearwardly projecting portion 14$^b$, curved at its rear end, and an inwardly extending arm 14$^c$ into which the curve merges The portion 14$^b$ is connected by bolts 19 to the side of a rigid bracket 20 which is adapted to be secured to the rear end of one of the vehicle side sills 18 by suitable bolts 21, or otherwise. The bracket 20 is provided with a groove 22 (Fig. 4) in which snugly fits the portion 14$^b$.

In the modification shown in Figs. 5 and 6, the spring supporting bar 14 is differently shaped, being generally in the form of an L. In this modification, the impact section of the fender guard is shown as comprising two parallel arcuate spring bars 23 provided at their ends with integral eyes 25 through which the bolts 16 project, the bolts also extending through the integral eyes on the ends of the supporting bar 14. The spring bar 14 projects through a slot 24 (Fig. 5) formed in a securing bracket 26, which is adapted to be connected to the end of the side sill or other part of the chassis frame by means of a U-bolt 27 or any other desired means. A screw or bolt 28 fastens the bar 14 in the slot 24. An additional or reinforcing bracket 30 is provided for securing the supporting bar 14 to the chassis frame or to a tire carrier. This arm 30 is preferably formed of a strap of spring-metal and is L-shaped. Its rear end is connected by a bolt to the rearwardly extending arm of the supporting bar 14 and a hook-bolt 31 is adapted to secure its forward end to a suitable part of the chassis frame or to a tire-carrier.

In Fig. 7, I have shown the L-shaped spring supporting bar 14 as supporting a channel-shaped impact bar 11 of the form shown in Figs. 1, 2 and 3. The outwardly extending arm of the supporting bar 14 is connected to one end of a bracket 32 by means of bolts and the other end of the bracket is adapted to be connected by means of bolts 33 to a rear cross bar 34 of the chassis frame.

In the modification shown in Fig. 8, the supporting bar 14 is shaped similarly to that shown in Fig. 1 and its ends are connected to parallel spring impact bars 23 like those shown in Figs. 5 and 6. The rearwardly extending portion 14$^b$ of the supporting bar is connected by bolts to a supporting bracket 35 and the bracket is adapted to be connected to the side of the rear end of the side sill by means of a bolt 36 and to a rear cross-bar by means of a bolt 37.

In the modification shown in Fig. 9, the structure is quite similar to that shown in Fig. 8, except that the bracket 36 is formed so that it may be connected to the end and side of the side sill by bolts 37' and 38, respectively.

In the modification shown in Fig. 10, the spring supporting bar is formed of two pieces $14^d$ and $14^e$. The part $14^d$ has its end portions inclined forwardly and its central portion is connected to a bracket 26 like that shown in Fig. 5. The part $14^e$ is secured to the inner inclined portion of the part $14^d$ by means of rivets 40 and an L-shaped bracket 41 is secured by means of rivets to the forward end of the part $14^e$. The bracket 41 is provided with a hole for the reception of a bolt 42 which is adapted to connect the bracket 41 to a rear part 44 of the chassis frame, such, for example, as a rear bar or a sheet-metal cover for the gasoline tank. The rear end of the part $14^e$ is provided with an integral eye, as is the outer end of the part $14^d$, parallel impact bars being connected to the eyes by means of the bolts 16, as described above in connection with Figs. 5 and 6.

It will be understood that in each of the forms of embodiment shown in the drawings and described above, either the rigid channel-shaped impact bar 11 or the spring impact bars 23 may be employed as desired.

I claim:

1. In an automobile bumper, the combination of a bracket secured to the side of the automobile frame and projecting substantially in line with said frame, an arm supported by said bracket and extending horizontally on either side of said bracket and an impact member secured by its ends to the ends of said arm.

2. In an automobile bumper for the rear of vehicles, the combination of a bracket secured to the side of the vehicle, an arm secured to said bracket, said arm projecting horizontally for a limited distance towards the center of the vehicle and an impact member secured by its end to said arm.

3. In an automobile bumper for the rear of vehicles, the combination of a bracket secured to the side of the vehicle, an arm secured to said bracket, said arm bent rearwards at right angles towards the center of the vehicle and an impact member parallel with and pivotally secured to said arm.

4. An impact structure comprising an impact bar of arcuate form, a spring bar having its opposite ends pivotally connected to the respective ends of said bar and bent to provide a rearwardly extending portion, a bracket adapted to be secured to the vehicle frame, and means for securing said rearwardly projecting part of said spring bar to said bracket.

5. An impact structure comprising an impact bar, a spring supporting bar pivoted at its ends to the ends of said impact bar and bent to provide two laterally projecting portions and an intermediate rearwardly projecting portion, the ends of the laterally projecting portions being pivoted to the impact member, and a bracket connected to the rearwardly extending portion of said spring bar.

6. An impact structure comprising an impact bar, a spring bar having its opposite ends pivotally connected to the respective ends of said impact bar, a bracket adapted to be secured to the vehicle frame and provided with a groove for accommodating part of said spring bar, and means securing said bracket and said last-mentioned part together.

7. An impact structure comprising an impact bar, and supporting means therefor comprising a spring arm projecting outwardly and pivoted to one end of said impact bar and a spring bar extending rearwardly and then inwardly and connected at its end to the other end of said impact bar.

8. An impact structure comprising an impact bar, supporting means therefor comprising a spring arm projecting outwardly and connected to one end of said impact bar and a spring bar extending rearwardly and then inwardly and connected at its end to the other end of said impact bar, and a bracket for mounting said structure on the vehicle frame and connected to said rearwardly extending arm.

9. An impact structure comprising an impact bar, supporting means therefor comprising a spring arm projecting outwardly and pivoted to one end of said impact bar and a spring extending rearwardly and then inwardly and connected at its end to the other end of said impact bar, and a bracket for mounting said structure on the vehicle frame and connected to said rearwardly extending arm, and having a groove in which said rearwardly extending arm is mounted.

HERBERT W. TINKER.